(12) United States Patent
Zheng et al.

(10) Patent No.: US 11,275,472 B2
(45) Date of Patent: Mar. 15, 2022

(54) DISPLAY DEVICE AND TERMINAL

(71) Applicant: SHENZHEN CHINA STAR OPTOELECTRONICS SEMICONDUCTOR DISPLAY TECHNOLOGY CO., LTD., Shenzhen (CN)

(72) Inventors: Jiexin Zheng, Shenzhen (CN); Qikun Liu, Shenzhen (CN)

(*) Notice: Subject to any disclaimer, the term of this patent is extended or adjusted under 35 U.S.C. 154(b) by 238 days.

(21) Appl. No.: 16/623,787

(22) PCT Filed: Nov. 21, 2019

(86) PCT No.: PCT/CN2019/119988
§ 371 (c)(1),
(2) Date: Dec. 18, 2019

(87) PCT Pub. No.: WO2021/092993
PCT Pub. Date: May 20, 2021

(65) Prior Publication Data
US 2021/0333933 A1 Oct. 28, 2021

(30) Foreign Application Priority Data
Nov. 12, 2019 (CN) ............................ 20191100044.0

(51) Int. Cl.
*G06F 3/044* (2006.01)
*G06F 3/041* (2006.01)

(52) U.S. Cl.
CPC .......... *G06F 3/0443* (2019.05); *G06F 3/0446* (2019.05); *G06F 3/0448* (2019.05); *G06F 3/04164* (2019.05)

(58) Field of Classification Search
CPC .. G06F 3/0443; G06F 3/0446; G06F 3/04164; G06F 3/0448
USPC .......................................................... 345/174
See application file for complete search history.

(56) References Cited

U.S. PATENT DOCUMENTS

| 2011/0062971 A1* | 3/2011 | Badaye ................. G06F 3/0443 324/686 |
| 2012/0133613 A1 | 5/2012 | Chen et al. |
| 2014/0267956 A1* | 9/2014 | Liu ........................ G06F 3/0443 349/12 |
| 2015/0028894 A1* | 1/2015 | Sleeman ............... G06F 3/0446 324/662 |

(Continued)

FOREIGN PATENT DOCUMENTS

| CN | 102479011 A | 5/2012 |
| CN | 203133794 U | 8/2013 |

(Continued)

*Primary Examiner* — Mark Edwards

(57) ABSTRACT

The present invention provides a display device and a terminal. The display device includes a display panel and a touch layer. The touch layer includes a plurality of first touch electrodes and a plurality of second touch electrodes disposed in a same layer and not in contact with each other. The first touch electrodes and the second touch electrodes are alternately arranged in a first direction. The second touch electrodes include a plurality of touch units arranged in a second direction and connected with each other. Surface areas of the plurality of touch units in the same second touch electrode are not equal. The invention reduces a width of a flexible circuit board.

10 Claims, 4 Drawing Sheets

(56) References Cited

U.S. PATENT DOCUMENTS

2017/0060318 A1  3/2017  Gu et al.
2017/0192575 A1  7/2017  Jin
2019/0243227 A1* 8/2019  Den Boer ............... G06F 3/044

FOREIGN PATENT DOCUMENTS

| CN | 104765499 A | 7/2015 |
| CN | 105955558 A | 9/2016 |
| CN | 107967085 A | 4/2018 |

* cited by examiner

DISPLAY DEVICE AND TERMINAL

FIELD OF INVENTION

The present application relates to the field of display technologies, and in particular, to a display device and a terminal.

BACKGROUND OF INVENTION

In current touch panel using a single-layer mutual capacitance structure, drive electrodes and sensing electrodes are close to each other to form lateral capacitances. The driving electrodes are used as input terminals to input sine wave signals, and the sensing electrodes are used as detection terminals. When fingers touch a surface of the touch panel, coordinates of touch positions are determined according to detected changes of input signals.

Both the input terminals and the detection terminals need to be connected to pins on flexible circuit boards through electrode lines. Since an input terminal corresponds to multiple detection terminals, and each the input terminals and each the detection terminals need to be connected to an electrode line and a pin, which eventually causes too many pins to be needed, and the flexible circuit board has a large width and cannot meet requirements of narrow frames.

Therefore, current display devices have technical problems that the electrode lines of touch electrodes are excessive and need to be improved.

SUMMARY OF INVENTION

The present invention provides a display device to alleviate a technical problem that electrode lines of touch electrodes in current display devices are excessive.

In order to solve above problems, technical solutions provided by the present invention are as follows:

The present invention provides a display device comprising:
 a display panel;
 a touch layer formed on one side of the display panel;
 wherein the touch layer comprises a plurality of first touch electrodes and a plurality of second touch electrodes disposed in a same layer and not in contact with each other, each of the first touch electrodes is connected to a first electrode line, and each of the second touch electrodes is connected to a second electrode line; wherein the first touch electrodes and the second touch electrodes are alternately arranged in a first direction, and the second touch electrodes comprises a plurality of touch units arranged in a second direction and connected with each other; wherein the second direction is perpendicular to the first direction, and surface areas of the plurality of touch units in the same second touch electrode are not equal.

In the display device of the present invention, in the same second touch electrode, the surface areas of the plurality of touch units are gradually increased along the second direction.

In the display device of the present invention, in the same second touch electrode, the surface areas of the plurality of touch units are gradually reduced from a middle to two ends.

In the display device of the present invention, a number of the touch units in each of the second touch electrodes is same, and the surface areas of each the touch units in the different second touch electrodes are correspondingly same.

In the display device of the present invention, arrangement orders of the touch units in all the second touch electrodes are the same.

In the display device of the present invention, arrangement orders of the touch units in at least some of the second touch electrodes are different from arrangement orders of the touch units in other second touch electrodes.

In the display device of the present invention, in the plurality of second touch electrodes arranged along the first direction, arrangement orders of the touch units in each odd-numbered of the second touch electrodes are the same, and arrangement orders of the touch units in the odd-numbered and even-numbered of the second touch electrodes are different.

In the display device of the present invention, the touch layer comprises a first repeating unit and a second repeating unit, and each of the first repeating unit and the second repeating unit comprises at least two adjacent second touch electrodes; wherein the touch units of the second touch electrodes in the first repeating unit are arranged in the same order, and the touch units of the second touch electrodes in the second repeating unit are arranged in the same order; wherein the touch units of the second touch electrodes in the first repeating unit and the second repeating unit are arranged in a different order, and the first repeating unit and the second repeating unit are alternately arranged in the first direction.

In the display device of the present invention, a number of the touch units in each of the second touch electrodes is same, and the surface areas of the touch units are at least partially different in the different second touch electrodes.

In the display device of the present invention, a surface shape of the touch unit is at least one of a rectangle, a trapezoid, and a circle.

The present invention further provides a terminal comprising a display device and a main board connected to the display device. The display device comprises:
 a display panel;
 a touch layer formed on one side of the display panel;
 wherein the touch layer comprises a plurality of first touch electrodes and a plurality of second touch electrodes disposed in a same layer and not in contact with each other, each of the first touch electrodes is connected to a first electrode line, and each of the second touch electrodes is connected to a second electrode line; wherein the first touch electrodes and the second touch electrodes are alternately arranged in a first direction, and the second touch electrodes comprises a plurality of touch units arranged in a second direction and connected with each other; wherein the second direction is perpendicular to the first direction, and surface areas of the plurality of touch units in the same second touch electrode are not equal.

In the terminal of the present invention, in the same second touch electrode, the surface areas of the plurality of touch units are gradually increased along the second direction.

In the terminal of the present invention, in the same second touch electrode, the surface areas of the plurality of touch units are gradually reduced from a middle to two ends.

In the terminal of the present invention, a number of the touch units in each of the second touch electrodes is same, and the surface areas of each the touch units in the different second touch electrodes are correspondingly same.

In the terminal of the present invention, arrangement orders of the touch units in all the second touch electrodes are the same.

In the terminal of the present invention, arrangement orders of the touch units in at least some of the second touch electrodes are different from arrangement orders of the touch units in other second touch electrodes.

In the terminal of the present invention, in the plurality of second touch electrodes arranged along the first direction, arrangement orders of the touch units in each odd-numbered of the second touch electrodes are the same, and arrangement orders of the touch units in the odd-numbered and even-numbered of the second touch electrodes are different.

In the terminal of the present invention, the touch layer comprises a first repeating unit and a second repeating unit, and each of the first repeating unit and the second repeating unit comprises at least two adjacent second touch electrodes; wherein the touch units of the second touch electrodes in the first repeating unit are arranged in the same order, and the touch units of the second touch electrodes in the second repeating unit are arranged in the same order; wherein the touch units of the second touch electrodes in the first repeating unit and the second repeating unit are arranged in a different order, and the first repeating unit and the second repeating unit are alternately arranged in the first direction.

In the terminal of the present invention, a number of the touch units in each of the second touch electrodes is same, and the surface areas of the touch units are at least partially different in the different second touch electrodes.

In the terminal of the present invention, a surface shape of the touch unit is at least one of a rectangle, a trapezoid, and a circle.

The beneficial effects of the invention are: The present invention provides a display device and a terminal. The display device comprises a display panel and a touch layer formed on one side of the display panel. The touch layer comprises a plurality of first touch electrodes and a plurality of second touch electrodes disposed in a same layer and not in contact with each other, each of the first touch electrodes is connected to a first electrode line, and each of the second touch electrodes is connected to a second electrode line. The first touch electrodes and the second touch electrodes are alternately arranged in a first direction, and the second touch electrodes comprises a plurality of touch units arranged in a second direction and connected with each other. The second direction is perpendicular to the first direction, and surface areas of the plurality of touch units in the same second touch electrode are not equal. By disposing the second touch electrodes as a plurality of touch units that are connected to each other and have different surface areas, and making the touch units corresponding to the same first touch electrode, when fingers touch different positions on the second touch electrode, the corresponding capacitance values change differently. Therefore, the capacitance change values of a plurality of points on the second touch electrode can be measured through one second electrode line, thereby greatly reducing a number of electrode lines. The number of pins required for subsequent binding to a flexible circuit board is also greatly reduced, thereby reducing a width of the flexible circuit board and achieving narrow frames.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

The following description of the various embodiments is provided with reference to the accompanying drawings. Directional terms, such as upper, lower, front, back, left, right, inner, outer, and lateral side, mentioned in the present invention are only for reference. Therefore, the directional terms are used for describing and understanding rather than limiting the present invention. In the figures, units having similar structures are used for the same reference numbers.

The present invention provides a display device and a terminal to alleviate a technical problem that electrode lines of touch electrodes in current display devices are excessive.

Figure 2:
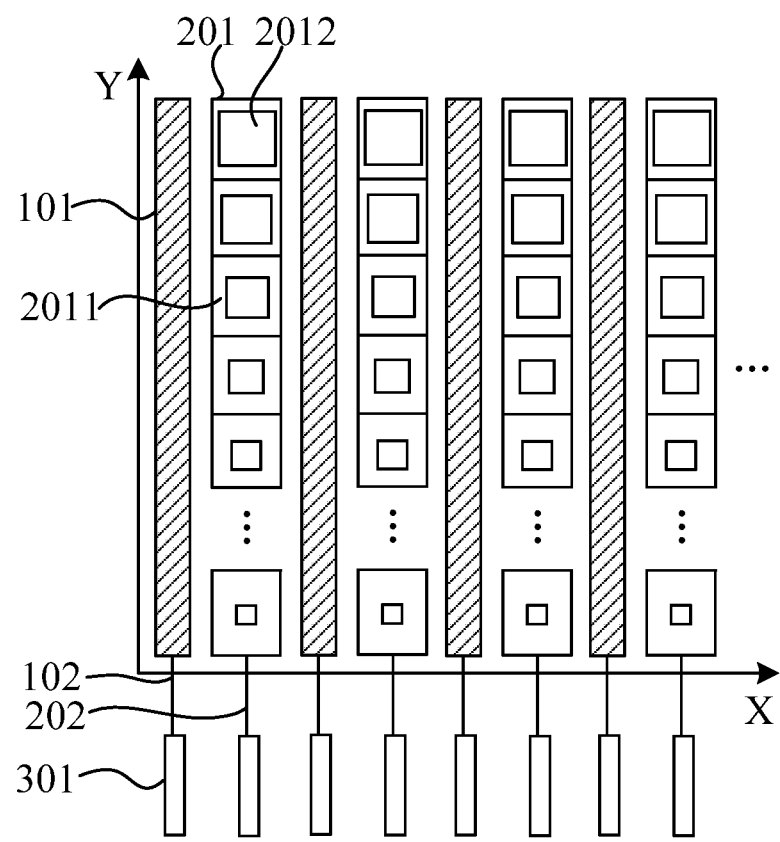
FIG. 2 is a schematic view of a first planar structure of a touch layer in a display device according to an embodiment of the present invention.

As shown in FIG. 2, the present invention provides a display device and a terminal. The display device comprises a display panel and a touch layer 200 formed on one side of the display panel. The touch layer comprises a plurality of first touch electrodes 101 and a plurality of second touch electrodes 102 disposed in a same layer and not in contact with each other. Each of the first touch electrodes 101 is connected to a first electrode line 102, and each of the second touch electrodes 201 is connected to a second electrode line 202. The first touch electrodes 101 and the second touch electrodes 201 are alternately arranged in a first direction X, and the second touch electrodes 201 comprises a plurality of touch units 2011 arranged in a second direction Y and connected with each other. The second direction Y is perpendicular to the first direction X, and surface areas of the plurality of touch units 2011 in the same second touch electrode 201 are not equal.

In the present invention, the display panel may be an OLED display panel or a liquid crystal display panel. When the display panel is the OLED display panel, a substrate, a driving circuit layer, and a light emitting layer are included. When the display panel is the liquid crystal display panel, a first substrate and a second substrate disposed opposite to each other, and a liquid crystal layer filled between the first substrate and the second substrate are included. Generally, the first substrate is an array substrate comprising a first substrate, a driving circuit layer, and a pixel electrode which are stackedly disposed. The second substrate is a color film substrate comprising a second substrate, a black matrix and a color resist layer, and a common electrode. When the display panel is a color filter on array (COA) type liquid crystal display panel, the first substrate comprises a first substrate, a driving circuit layer, a color resist layer, and a pixel electrode which are stackedly disposed; and the second substrate comprises a second substrate, a black matrix, and a common electrode stacked in a stack. This application does not limit types of the display panels.

A polarizer is formed on both sides of the display panel, and the touch layer 200 is formed between the display panel and the polarizer, that is, an on-cell structure. The display device of the on-cell structure is relatively thin and light, and is widely used in display devices.

The touch layer 200 of the present invention uses a single-layer mutual capacitance structure, that is, the first touch electrode 101 and the second touch electrode 201 are formed on the same layer. The first touch electrode 101 is a driving electrode TX, and the second touch electrode 201 is a sensing electrode RX. Both the first touch electrode 101 and the second touch electrode 201 are strip-shaped structures and are alternately arranged along the first direction X. The first touch electrode 101 and the second touch electrode 201 are insulated from each other, that is, not in contact with each other. A lateral capacitance is formed between the adjacent first touch electrode 101 and the second touch electrode 201.

The first touch electrode 101 is connected to a first electrode line 102, and the second touch electrode 201 is connected to a second electrode line 202. After the subsequent display panel is connected to the flexible circuit board, the first electrode line 102 and the second electrode line 202 are connected to pins 301 on the flexible circuit board, and an electrical signal transmission is realized with the flexible circuit board.

The second touch electrodes 201 are strip-shaped structures, and each of the second touch electrodes 201 comprises a plurality of touch units 2011. The plurality of touch units 2011 are arranged along the second direction Y and are connected to each other. Each touch units 2011 comprises a surface 2012. Fingers contact the surface 2012 when the fingers touching. In the same second touch electrode 201, surface areas of all the touch units 2011 are different.

When the touch layer 200 is working normally, the first touch electrode 101 inputs a sine wave signal as an input terminal, the second touch electrode 201 adjacent thereto as a detection terminal, and a corresponding AC waveform is obtained by a coupling capacitance between them. The detected AC waveform remains stable when no touch action is taken. When a finger touches the touch layer 200, the finger contacts the surface 2012 of the touch unit 2011. A capacitance formed between the finger and the touch layer 200 reduces the coupling capacitance between the first touch electrode 101 and the second touch electrode 201, so that the detected amplitude of the AC signal becomes weak, thereby determining coordinates of a touch position according to a detection result.

Figure 4:
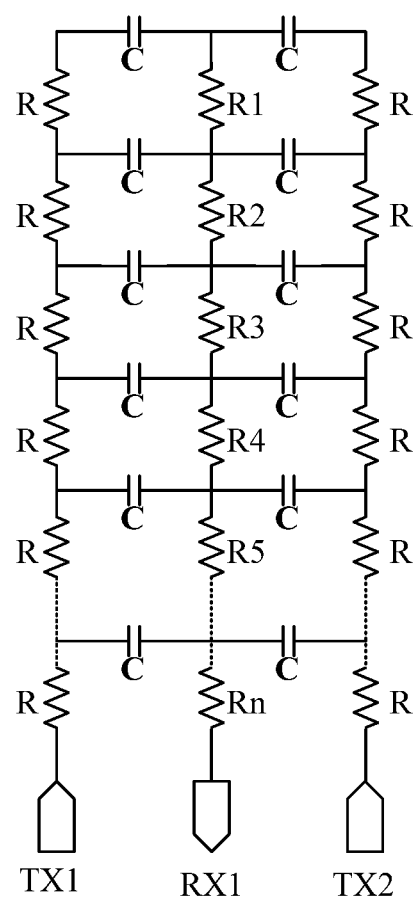
FIG. 4 is a schematic view of a capacitance equivalent of the touch layer in the display device according to the embodiment of the present invention.

As shown in FIG. 4, which is a capacitor equivalent diagram of the touch layer in the display device provided by the embodiment of the present invention. Selecting a RX1 from the second touch electrodes 201, and the first touch electrodes 101 adjacent to both sides of the RX1 are a TX1 and a TX2, respectively. Then, a coupling capacitor C is generated between the RX1 and the TX1/TX2 on the left and right sides.

Each touch units in the RX1 has a same distance, so the TX1 is equivalent to multi-segment connection. Each segment corresponds to a touch unit 2011, and a resistance of each segment is R. The resistances of the touch units 2011 in the RX1 are R1, R2, . . . , Rn, respectively. Since the surface areas of the touch units 2011 are different, the resistances are not equal. Similarly, the TX2 is equivalent to a multi-segment connection, in which each segment corresponds to a touch unit 2011, and a resistance of each segment is R.

According to the parallel plate capacitor formula $C=\varepsilon *S/d$, since the surface areas of the touch unit 2011 are different, when the finger touches different touch units 2011, the capacitance generated between the two is different, and a change range of the corresponding sinusoidal signal is also different. Therefore, first, the second electrode line 202 with detected signal is determined to determine the X coordinate of the touch point, and then according to the second electrode line 202 and a change of the detected capacitance, counter-inference the touch position of the finger to determine the Y coordinate of the touch point.

Figure 1:
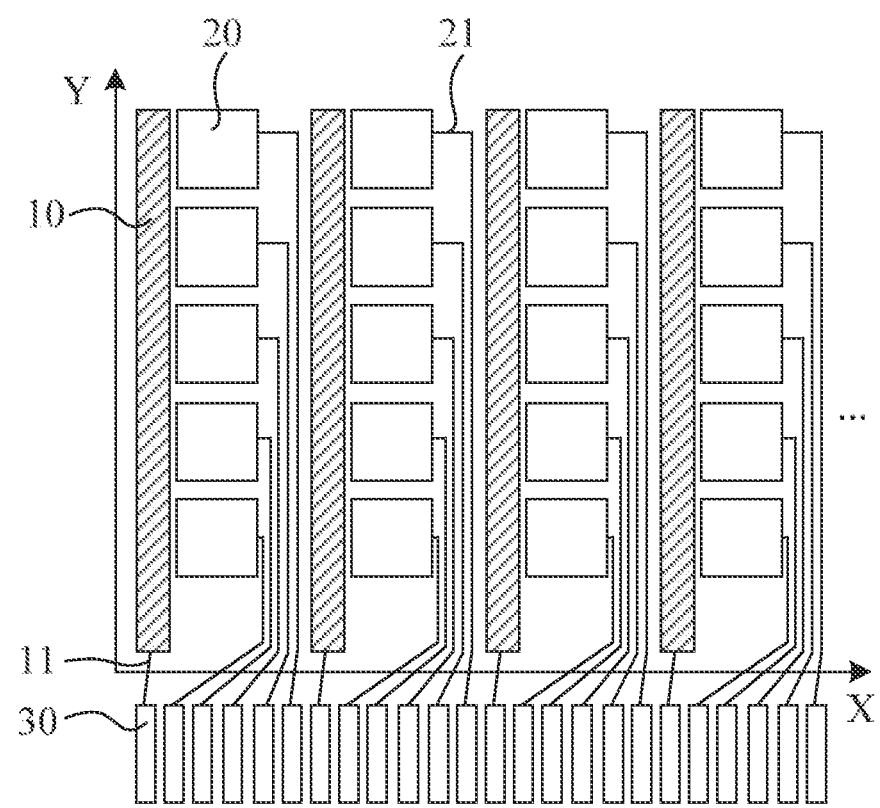
FIG. 1 is a schematic structural view of a touch layer in a display device of a prior art.

As shown in FIG. 1, which is a schematic structural view of a touch layer in a display device of the prior art. The touch layer comprises a driving electrode 10 and a sensing electrode 20, a number of sensing electrodes 20 adjacent to the same driving electrode 10 is plural, and the sensing electrodes 20 are not in contact with each other. When a signal is input to one of the driving electrodes 10, corresponding to a same X value, if a touch condition at a different point in a Y direction is to be detected, it is necessary to extract a sensing electrode line 21 from each of the sensing electrodes 20, and respectively detect the change of the coupling capacitance between the corresponding sensing electrode 20 and the driving electrode 10, so as to determine correct touch point coordinates.

Based on this, a driving electrode line 10 needs to be taken out corresponding to each driving electrode 10. A sensing electrode line 20 needs to be taken out corresponding to each sensing electrode 20. The driving electrode line 10 and the sensing electrode line 20 need to be connected to the pins 30 on the flexible circuit board. Corresponding to the display device with resolution (a, b), that is, there are a column of driving electrodes 10 and b rows of sensing electrodes 20, and a total number of the pins required is $a*(1+b)$. When a size of the display panel is increased, an excessive number of the pins may cause a width of the flexible circuit board unable to correspond, which limits an application range of the touch layer of the single-layer mutual capacitance structure.

In the present invention, the second touch electrodes 201 are configured to be connected to the plurality of touch units 2011, the second touch electrode 201 is also a strip, and each second touch electrodes 201 is provided with a second electrode line 202. At this time, for the display device with the resolution of (a, b), the total number of the pins required is 2a. When the size in the second direction of the display panel is increased, the number of the pins is not increased, so that the applicability to the large-sized panel is enhanced.

The second touch electrodes 201 of the present invention are disposed as a plurality of touch units 2011 that are connected to each other and have different surface areas, corresponding to the same first touch electrodes 101. When the finger touches different positions on the second touch electrode 201, the corresponding capacitance value changes differently. Therefore, a capacitance change value of the plurality of points on the second touch electrodes 201 can be measured by using one second electrode line 202, thereby greatly reducing the number of electrode lines. A number of pins 301 required for subsequent connecting to the flexible circuit board is also greatly reduced, thereby reducing the width of the flexible circuit board and achieving a narrow frame.

In an embodiment, a number of the touch units 2011 in each of the second touch electrodes 201 is same, and the surface areas of each the touch units 2011 in the different second touch electrodes 201 are correspondingly same.

The surface area of each touch units 2011 in the same second touch electrode 201 is different. It is assumed that one of the second touch electrodes 201 has n touch units 2011, and the surface area of each touch units 2011 is represented by S1, S2, . . . , Sn, respectively. The remaining touch electrodes 201 also include n touch units 2011, and the surface areas of the n touch units 2011 are also S1, S2, . . . , Sn. That is, in the entire display device, the surface areas of the touch unit 2011 have only n different values. Therefore, when the touch layer 200 is prepared, it is not necessary to set too much surface area value, and a preparation is relatively simple.

In this case, an arrangement order of the touch units 2011 in a same second touch electrode 201 can be in various ways.

In an embodiment, as shown in FIG. 2, in the same second touch electrode 201, the surface areas of the plurality of touch units 2011 gradually increase along the second direction Y. The second direction Y is an up and down direction in the drawings, and the surface areas of the plurality of touch units 2011 may gradually increase along the second direction Y, or may be gradually decreased. By arranging the surface areas of the plurality of touch units 2011 in the same second touch electrode 201 in order of size, the capacitance variation amplitude is also regularly increased or decreased during the touch control, and the detection is simpler and easier to operate.

Figure 3:
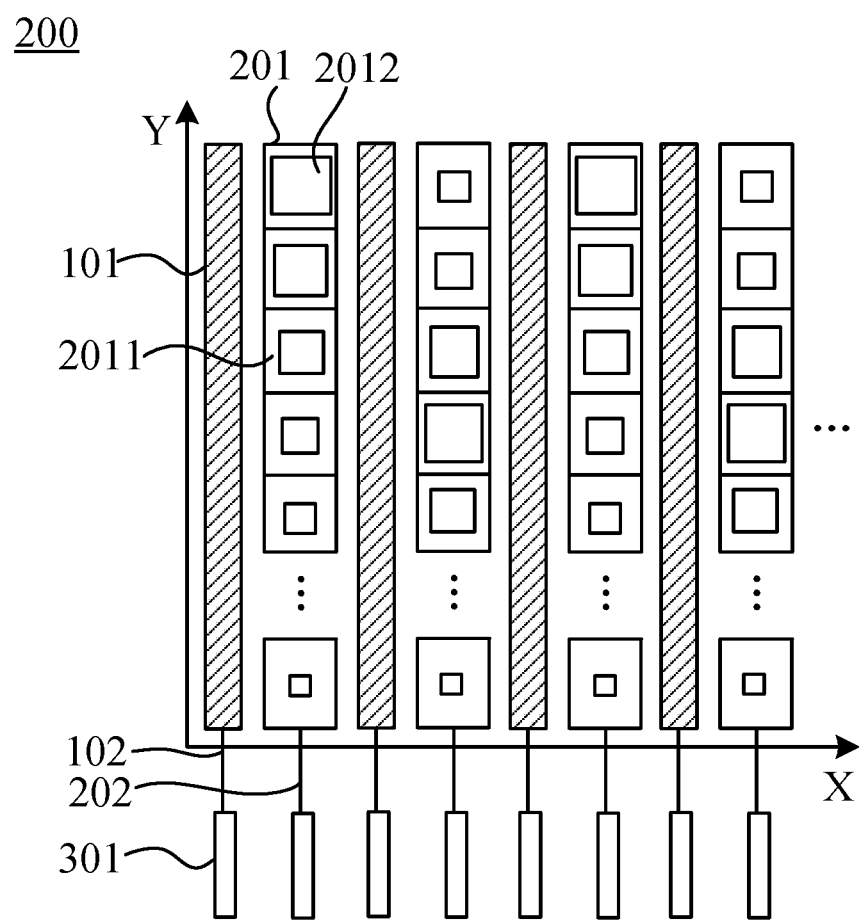
FIG. 3 is a schematic view of a second planar structure of the touch layer in the display device according to the embodiment of the present invention.

In an embodiment, as shown in FIG. 3, in the same second touch electrode 201, the surface areas of the plurality of touch units 2011 are gradually reduced from a middle to two ends. Normally, users have a higher touch frequency in the middle of the display panel, and have lower touch frequency on the both ends, so a sensitivity of the middle touch is higher. According to the parallel plate capacitor formula C=ε*S/d, the surface area of the middle touch unit 2011 is greater, and the capacitance generated by the finger touch is greater. That is, the change in capacitance is greater, so it is easier to detect, and the sensitivity of touch is higher.

Of course, in the same second touch electrode 201, the arrangement order of the plurality of touch units 2011 is not limited thereto, and there may be other manners. The designer of the field can reasonably arrange the order of the multiple touch units 2011 as needed.

In the same second touch electrode 201, the surface area of each touch units 2011 is different. A plurality of second touch electrodes 201 are disposed corresponding to the entire display device, and the arrangement order of the touch units 2011 in the second touch electrodes 201 may be the same or different.

In an embodiment, as shown in FIG. 2, the touch units 2011 of all the second touch electrodes 201 are arranged in the same order. The number of columns in which the first touch electrodes 101 are disposed is ignored, and only the number of columns in which the second touch electrodes 201 are disposed is calculated. In the second touch electrode 201 of the first row in FIG. 2, the surface areas of the plurality of touch units 2011 gradually increase along the second direction Y, and the arrangement order of the touch units 2011 in the second touch electrodes 201 of the other columns is the same as that in the first column of the second touch electrodes 201, that is, the arrangement order of the surface areas is gradually increased along the second direction Y.

When the arrangement order of the touch units 2011 in all the second touch electrodes 201 is the same, the touch layer 200 is relatively simple to manufacture, and the corresponding capacitance change value is small and is easy to manage.

In an embodiment, the arrangement orders of the touch units 2011 in at least some of the second touch electrodes 201 are different from the arrangement orders of the touch units 2011 in other second touch electrodes 201.

As shown in FIG. 3, in the plurality of second touch electrodes 201 arranged along the first direction X, the arrangement orders of the touch units 2011 in each odd-numbered of the second touch electrodes 201 are the same, and the arrangement orders of the touch units 2011 in the odd-numbered and even-numbered of the second touch electrodes 201 are different.

The number of columns in which the first touch electrodes 101 are disposed is ignored, and only the number of columns in which the second touch electrodes 201 are disposed is calculated. In the second touch electrodes 201 in which the first column, the third column, the fifth column, and the like are arranged in an odd number, the surface areas of the plurality of touch units 2011 gradually increase along the second direction Y. In the second touch electrodes 201 of the other columns, the surface area of each touch unit 2011 may be gradually decreased along the second direction Y, or may be gradually decreased from the middle to the both ends, or a part gradually decreases in the second direction Y, and the other part gradually decreases from the middle to the both ends.

Similarly, it can be arranged in reverse. The second touch electrodes 201 arranged in the first direction X are arranged in the same order in the second touch electrodes 201 of the even-numbered second touch electrodes 201, and the order of the touch units 2011 arranged in the odd-numbered and even-numbered second touch electrodes 201 is different.

The number of columns in which the first touch electrodes 101 are disposed is ignored, and only the number of columns in which the second touch electrodes 201 are disposed is calculated. In the second touch electrodes 201 in which the second column, the fourth column, the sixth column, and the like are arranged in an even number, the surface areas of the plurality of touch units 2011 gradually increase along the second direction Y. In the second touch electrodes 201 of the other columns, the surface areas of each touch units 2011 may be gradually decreased along the second direction Y, or may be gradually decreased from the middle to the both ends, or a part gradually decreases in the second direction Y, and the other part gradually decreases from the middle to the both ends.

In the above embodiments, the arrangement order of the touch units 2011 in the two adjacent second touch electrodes 201 is different. Therefore, when the finger touches, voltages generated by the two adjacent second touch electrodes 201 are different, and the corresponding detected voltage changes are different, thereby improving the detection accuracy.

In an embodiment, the touch layer 200 comprises a first repeating unit and a second repeating unit, and each of the first repeating unit and the second repeating unit comprises at least two adjacent second touch electrodes 201. The touch units 2011 of the second touch electrodes 201 in the first repeating unit are arranged in the same order, and the touch units 2011 of the second touch electrodes 201 in the second repeating unit are arranged in the same order. The touch units 2011 of the second touch electrodes 201 in the first repeating unit and the second repeating unit are arranged in a different order, and the first repeating unit and the second repeating unit are alternately arranged in the first direction X.

In the embodiment, at least two adjacent second touch electrodes 201 are used as the first repeating unit, and at least two adjacent second touch electrodes 201 are used as the second repeating unit. In the same type of repeating unit, the touch units 2011 are arranged in the same order. The first repeating unit and the second repeating unit are alternately arranged in the first direction X. The number of second touch electrodes 201 comprised in the first repeating unit and the second repeating unit can be selected according to needs.

Among the two adjacent repeating units, the arrangement orders of the touch units 2011 in the second touch electrodes 201 are different. Therefore, when the finger touches, the voltages generated by the second touch electrode 201 in the two adjacent repeating units are different, and the corresponding detected voltage changes are also different, thereby improving the detection accuracy.

In all the above embodiments, the surface areas of the touch units 2011 in the display device have only n different values, but the present invention is not limited thereto. In an embodiment, the number of the touch units 2011 in the second touch electrodes 201 is same, and the surface area of each touch units 2011 in the second touch electrodes 21 is at least partially unequal.

It is assumed that one of the second touch electrodes 201 has n touch units 2011, and the surface area of each touch units 2011 is represented by S1, S2, . . . , Sn, respectively, and each of the remaining second touch electrodes 201 also comprise n touch units 2011. However, at least one of the remaining second touch electrodes 201 comprises at least one touch unit 2011 having a surface area that is different from the surface areas of the touch units 2011 of the other second touch electrodes 201. At this time, the surface areas of the touch units 2011 have at least n+1 different values in the entire display device.

When the surface area value of the touch units 2011 is more, the detected capacitance change value is more, and accordingly, the detection sensitivity is higher, and the detection is more accurate. The surface area of all the touch units 2011 in the entire display device can be arranged to be different, and the capacitance change values of different touch points in the entire panel are different, and the detection accuracy is further improved.

In the present invention, a surface shape of the touch unit is at least one of a rectangle, a trapezoid, and a circle. The shapes of the touch units 2011 in the same second touch electrode 201 may be the same or different. The shapes of the touch units 2011 in different second touch electrodes 201 may be the same or different. The designer of the field can arrange the surface shape of the touch units 2011 according to needed.

The present invention further provides a terminal comprising a display device and a main board connected to the display device. The display device comprises a display panel and a touch layer formed on one side of the display panel. The touch layer comprises a plurality of first touch electrodes and a plurality of second touch electrodes disposed in a same layer and not in contact with each other, each of the first touch electrodes is connected to a first electrode line, and each of the second touch electrodes is connected to a second electrode line. The first touch electrodes and the second touch electrodes are alternately arranged in a first direction, and the second touch electrodes comprises a plurality of touch units arranged in a second direction and connected with each other. The second direction is perpendicular to the first direction, and surface areas of the plurality of touch units in the same second touch electrode are not equal.

In an embodiment, in the same second touch electrode, the surface areas of the plurality of touch units are gradually increased along the second direction.

In an embodiment, in the same second touch electrode, the surface areas of the plurality of touch units are gradually reduced from a middle to two ends.

In an embodiment, a number of the touch units in each of the second touch electrodes is same, and the surface areas of each the touch units in the different second touch electrodes are correspondingly same.

In an embodiment, arrangement orders of the touch units in all the second touch electrodes are the same.

In an embodiment, arrangement orders of the touch units in at least some of the second touch electrodes are different from arrangement orders of the touch units in other second touch electrodes.

In an embodiment, in the plurality of second touch electrodes arranged along the first direction, arrangement orders of the touch units in each odd-numbered of the second touch electrodes are the same, and arrangement orders of the touch units in the odd-numbered and even-numbered of the second touch electrodes are different.

In an embodiment, the touch layer comprises a first repeating unit and a second repeating unit, and each of the first repeating unit and the second repeating unit comprises at least two adjacent second touch electrodes. The touch units of the second touch electrodes in the first repeating unit are arranged in the same order, and the touch units of the second touch electrodes in the second repeating unit are arranged in the same order. The touch units of the second touch electrodes in the first repeating unit and the second repeating unit are arranged in a different order, and the first repeating unit and the second repeating unit are alternately arranged in the first direction.

In an embodiment, a number of the touch units in each of the second touch electrodes is same, and the surface areas of the touch units are at least partially different in the different second touch electrodes.

In an embodiment, a surface shape of the touch unit is at least one of a rectangle, a trapezoid, and a circle.

According to the above embodiment, it can be known that:

The present invention provides a display device and a terminal. The display device comprises a display panel and a touch layer formed on one side of the display panel. The touch layer comprises a plurality of first touch electrodes and a plurality of second touch electrodes disposed in a same layer and not in contact with each other, each of the first touch electrodes is connected to a first electrode line, and each of the second touch electrodes is connected to a second electrode line. The first touch electrodes and the second touch electrodes are alternately arranged in a first direction, and the second touch electrodes comprises a plurality of touch units arranged in a second direction and connected with each other. The second direction is perpendicular to the first direction, and surface areas of the plurality of touch units in the same second touch electrode are not equal. By disposing the second touch electrodes as a plurality of touch units that are connected to each other and have different surface areas, and making the touch units corresponding to the same first touch electrode, when fingers touch different positions on the second touch electrode, the corresponding capacitance values changes differently. Therefore, the capacitance change values of a plurality of points on the second touch electrode can be measured through one second electrode line, thereby greatly reducing a number of electrode lines. The number of pins required for subsequent binding to a flexible circuit board is also greatly reduced, thereby reducing a width of the flexible circuit board and achieving narrow frames.

In the above, various other corresponding changes and modifications can be made according to the technical solutions and technical ideas of the present invention to those skilled in the art, and all such changes and modifications are within the scope of the claims of the present invention.

What is claimed is:

1. A display device, comprising:
   a display panel;
   a touch layer formed on one side of the display panel;
   wherein the touch layer comprises a plurality of first touch electrodes and a plurality of second touch electrodes disposed in a same layer and not in contact with each other, each of the first touch electrodes is connected to a first electrode line, and each of the second touch electrodes is connected to a second electrode line;
   wherein the first touch electrodes and the second touch electrodes are alternately arranged in a first direction, and the second touch electrodes comprises a plurality of touch units arranged in a second direction and connected with each other;
   wherein the second direction is perpendicular to the first direction, and surface areas of the plurality of touch units in the same second touch electrode are not equal;
   wherein a number of the touch units in each of the second touch electrodes is same, and the surface areas of each the touch units in the different second touch electrodes are correspondingly same;
   wherein arrangement orders of the touch units in at least some of the second touch electrodes are different from arrangement orders of the touch units in other second touch electrodes;
   wherein the touch layer comprises a first repeating unit and a second repeating unit, and each of the first repeating unit and the second repeating unit comprises at least two adjacent second touch electrodes;
   wherein the touch units of the second touch electrodes in the first repeating unit are arranged in the same order, and the touch units of the second touch electrodes in the second repeating unit are arranged in the same order; and
   wherein the touch units of the second touch electrodes in the first repeating unit and the second repeating unit are arranged in a different order, and the first repeating unit and the second repeating unit are alternately arranged in the first direction.

2. The display device as claimed in claim 1, wherein in the same second touch electrode, the surface areas of the plurality of touch units are gradually increased along the second direction.

3. The display device as claimed in claim 1, wherein in the same second touch electrode, the surface areas of the plurality of touch units are gradually reduced from a middle to two ends.

4. The display device as claimed in claim 1, wherein in the plurality of second touch electrodes arranged along the first direction, arrangement orders of the touch units in each odd-numbered of the second touch electrodes are the same, and arrangement orders of the touch units in the odd-numbered and even-numbered of the second touch electrodes are different.

5. The display device as claimed in claim 1, wherein a surface shape of the touch unit is at least one of a rectangle, a trapezoid, and a circle.

6. A terminal, comprising:
   a display device and a main board connected to the display device, wherein the display device comprises:
   a display panel; and
   a touch layer formed on one side of the display panel;
   wherein the touch layer comprises a plurality of first touch electrodes and a plurality of second touch electrodes disposed in a same layer and not in contact with each other, each of the first touch electrodes is connected to a first electrode line, and each of the second touch electrodes is connected to a second electrode line;
   wherein the first touch electrodes and the second touch electrodes are alternately arranged in a first direction, and the second touch electrodes comprises a plurality of touch units arranged in a second direction and connected with each other;
   wherein the second direction is perpendicular to the first direction, and surface areas of the plurality of touch units in the same second touch electrode are not equal;
   wherein a number of the touch units in each of the second touch electrodes is same, and the surface areas of each the touch units in the different second touch electrodes are correspondingly same;
   wherein arrangement orders of the touch units in at least some of the second touch electrodes are different from arrangement orders of the touch units in other second touch electrodes;
   wherein the touch layer comprises a first repeating unit and a second repeating unit, and each of the first repeating unit and the second repeating unit comprises at least two adjacent second touch electrodes;
   wherein the touch units of the second touch electrodes in the first repeating unit are arranged in the same order, and the touch units of the second touch electrodes in the second repeating unit are arranged in the same order; and
   wherein the touch units of the second touch electrodes in the first repeating unit and the second repeating unit are arranged in a different order, and the first repeating unit and the second repeating unit are alternately arranged in the first direction.

7. The terminal as claimed in claim 6, wherein in the same second touch electrode, the surface areas of the plurality of touch units are gradually increased along the second direction.

8. The terminal as claimed in claim 6, wherein in the same second touch electrode, the surface areas of the plurality of touch units are gradually reduced from a middle to two ends.

9. The terminal as claimed in claim 6, wherein in the plurality of second touch electrodes arranged along the first direction, arrangement orders of the touch units in each odd-numbered of the second touch electrodes are the same, and arrangement orders of the touch units in the odd-numbered and even-numbered of the second touch electrodes are different.

10. The terminal as claimed in claim 6, wherein a surface shape of the touch unit is at least one of a rectangle, a trapezoid, and a circle.

* * * * *